United States Patent [19]

Friedman et al.

[11] Patent Number: 4,817,720

[45] Date of Patent: Apr. 4, 1989

[54] METHOD FOR FORMING A BARRIER TO FLUID FLOW IN AN OIL FORMATION ADJACENT TO A PRODUCING OIL WELL

[75] Inventors: Robert H. Friedman; Billy W. Surles, both of Houston, Tex.

[73] Assignee: Texaco Inc., White Plains, N.Y.

[21] Appl. No.: 242,240

[22] Filed: Sep. 9, 1988

Related U.S. Application Data

[63] Continuation-in-part of Ser. No. 135,163, Dec. 18, 1987, abandoned.

[51] Int. Cl.$^4$ ............................................. E21B 33/138
[52] U.S. Cl. ..................................................... 166/295
[58] Field of Search ................ 166/250, 294, 295, 300

[56] References Cited

U.S. PATENT DOCUMENTS

| | | | |
|---|---|---|---|
| 2,294,078 | 8/1942 | Dow et al. | 166/281 |
| 3,386,514 | 6/1968 | Weber | 166/294 X |
| 3,811,508 | 5/1974 | Friedman | 166/294 X |
| 3,866,685 | 2/1975 | Friedman | 166/294 |
| 4,275,788 | 6/1981 | Sweatman | 166/292 |
| 4,352,396 | 10/1982 | Friedman | 166/295 |
| 4,475,593 | 10/1984 | Friedman | 166/295 X |
| 4,662,449 | 5/1987 | Friedman | 166/295 |

Primary Examiner—George A. Suchfield
Attorney, Agent, or Firm—Jack H. Park; Kenneth R. Priem

[57] ABSTRACT

Our invention pertains to a method of treating an oil well completed in an oil containing consolidated limestone or dolomite formation, to form a fluid impermeable barrier in the formation some distance from the oil well. The barrier may be a cone or pancake shaped barrier below the perforation to prevent bottom water coning, or a cylindrical barrier may be formed opposite portions of the well perforations. An aqueous hydrcarbon emulsion treating fluid is used which comprises a hydrocarbon, water and surfactant, whose pH is in the rqnge of from 2 to 6 and preferably adjusted to a level determined experimentally to cause precipitation of hydrocarbon after exposure to the formation from 7 to 14 days. First the emulsion and then the displacement fluid are injected into the formation at a predetermined injection rate which causes the polyvalent metal ions to be extracted from said formation and accumulated in the treating fluid at a controlled rate. The level of polyvalent metal ions in the treating fluid reaches a critical concentration for precipitating hydrocarbon from the treating fluid after the treating fluid has been displaced away from the wellbore to the desired location.

12 Claims, No Drawings

METHOD FOR FORMING A BARRIER TO FLUID FLOW IN AN OIL FORMATION ADJACENT TO A PRODUCING OIL WELL

CROSS-REFERENCE TO RELATED APPLICATION

This application is a continuation-in-part of pending application Ser. No. 07/135,163 filed Dec. 18, 1987, now abandoned, for "Method For Forming A Barrier To Fluid Flow In An Oil Formation Adjacent To A Producing Oil Well."

FIELD OF THE INVENTION

This invention concerns a method for forming a barrier to fluid flow in a formation some distance from a well penetrating the formation to correct bottom water coning or, in a steam drive process, to block passage of steam vapors through a steam swept or steam override zone. More specifically, this invention concerns a method for injecting a resin emulsion treating fluid having pH in a critical range which causes polyvalent ions to be absorbed from the mineral portion of the formation until their concentration in the treating fluid rises to a value which causes precipitation of resin which forms the barrier.

BACKGROUND OF THE INVENTION

Many oil formations are known to exist in which the oil or liquid petroleum occupies the pore spaces in the upper portion of a permeable formation, and the water occupies the pore spaces in the lower portion of the same or a contiguous permeable formation. Water encountered in such aquifers underlying oil containing formations is ordinarily brine, having a specific gravity greater than 1 and frequently in the range of from 1.01 to 1.3, whereas the specific gravity of oil is about 0.8. Many crude oils are known which have higher specific gravities, but almost invariably the specific gravity of petroleum encountered in subterranean formations is less than the specific gravity of brines ordinarily associated with the petroleum formations. It is common practice to drill a producing well into such an oil formation to a point near the bottom of the oil-saturated interval, then to plug off the bottom of the well and to establish perforations through the well casing into the oil saturated formation through which fluid petroleum may flow, which permits it to be pumped or otherwise transported to the surface of the earth through the well. In many formations, a number of conditions coexist which results in the establishment of a phenomena known as bottom water coning, in which the oil-water interface is reformed from a previous essentially horizontal configuration into a cone rising along the walls of the oil well. This cone-shaped water saturated interval is formed as a result of pressure differentials created in the formation, which causes water to rise into the previously oil-saturated portion of the permeable formation despite the specific gravity difference between oil and water which would ordinarily maintain the water at a lower level. This problem frequently becomes so acute that in some instances the water-oil ratio rises to such a high value that further production of oil from the well is not commercially feasible. If the well is shut in and the pressure differentials created in the formation during the period of fluid production are allowed to equalize, some levelling of the oil-water interface occurs slowly, although the problem quickly reoccurs when production of oil from the well is resumed.

Many methods have been proposed in the prior art for treating a well afflicted with bottom water coning so as to reduce or eliminate the tendency for water to rise along the walls of a producing well resulting in the production of an ever increasing fraction of water from the well. Two methods have been disclosed by one of the present Applicants in U.S. Pat. No. 4,475,593 and in 4,662,449. U.S. Pat. No. 4,475,593 discloses a method for profile control in subterranean formations by the creation of a barrier at some desired distance remote from the well bore. The unique process of these two patents can be utilized to selectively exclude water from water producing intervals interspersed with the oil producing intervals in certain types of formation, specifically formations whose mineral matrix is mainly large unconsolidated sand-grains but it has not always been entirely satisfactory when used for treating a well completed in a limestone or dolomite formation. It is believed that the reason that the method has been successful when used is unconsolidated sands but has not always been entirely satisfactory when applied to limestone or dolomite oil formation is related to the differences in response of these formations to the acid wash pretreatment used in those cases. When the acid wash contacts large unconsolidated and particles in, for example, viscous oil formations whose mineral component is predominately unconsolidated sand, the extractable polyvalent metal ions which cause demulsification of the resin emulsion injected subsequently are quickly removed from the sand grain surface, leaving a zone of sand which is free of extractable metal ions to form a zone immediately adjacent to the well in which plugging will not occur. In the next step, the injected resin emulsion passes through the zone treated in the acid prewash step, and encounters no extractable metal ions. Since no polyvalent metal ions are contacted in this zone, no plugging occurs. When the resin emulsion passes beyond the acid prewashed zone, polyvalent metal ions are encountered, which causes precipitation of the resin from the resin emulsion, which quickly plugs the flow channels, forming the desired barrier, while leaving a zone between the barrier and the well which is unaffected.

By contrast, when the acid prewash is injected into a formation whose mineral constituent is highly consolidated limestone or dolomite, a different result is obtained. In consolidated sandstones, the metal ions, while present, are often not immediately accessible on the surface of the mineral matrix. The extractable polyvalent metal ions which cause resin precipitation from the resin emulsion treating fluid are distributed more uniformly throughout the consolidated mineral matrix. While the ions on the surface of the formations are removed by the acid wash, the surface left behind is not free of such extractable ions and so when the resin emulsion is injected, additional ions are removed, resulting in precipitation of the resin prematurely, thus reducing the permeability of the formation near the wellbore where no permeability reduction is desired.

Although many of the prior art methods proposed for treating wells to form a barrier in the formation for selective water exclusion or to cure bottom water coning have been at least partly successful in some applications, the problem still remain which are frequently encountered in consolidated formations. Accordingly, there is a substantial unfulfilled need for a method which is especially suitable for treating wells for preventing steam override or for selective water exclusion or to reduce bottom water coning in consolidated oil formations including limestone and dolomite.

SUMMARY OF THE INVENTION

This invention pertains to a method for forming a barrier to fluid flow in a subterranean petroleum formation including consolidated formations including sandstone or dolomite formations. In one embodiment, a barrier is formed for controlling the undesired flow of water or brine from an aquifer which underlies an oil-saturated subterranean formation into an oil well, referred to as bottom water coning. For this embodiment, the invention provides a method for forming a disk or cone shaped water impermeable barrier in the formation adjacent to the production well, below the zone where bottom water coning was previously occurring, which prevents the upward flow of water or brine into the perforations of the producing well during the period when oil production is occurring. The barrier may also be formed in water producing layers adjacent to oil producing intervals or as a barrier to steam vapor flow from steam swept or steam override zones in steam drive oil recovery processes.

The method of this invention utilizes polyvalent metal ions extractable from reservoir formation mineral matrix to trigger demulsification of an injected aqueous resin emulsion composition. The pH of the resin emulsion is adjusted to a value in the range of 2 to 6 and preferably 3 to 5, depending on the nature of the formation material present. Preferably, the value is determined experimentally using formation core sample material to identify the pH which causes extraction of polyvalent metal ions, especially ferric or ferrous ions at a predetermined controlled rate. A predetermined quantity of the resin emulsion is injected into the formation and displaced away from the well by injecting water or brine. As the resin emulsion passes through the formation, the polyvalent metal ions are slowly extracted from the formation causing the concentration of these ions in the resin emulsion to increase slowly as the slug of resin emulsions is displaced through the formation by the water or brine. Injection into the well is reduced to a very low level when the emulsion reaches the zone where the barrier is to be formed, and maintained at a low positive injection rate, in the range of 1 to 100 gallons per hour, or any value sufficient to keep the slug of resin moving slowly through the formation for a period of time in the range of 6 to 14 days. We have found that the well should not be shut in completely during this curing period. During or after the waiting period the emulsion breaks, leaving resin droplets in the formation flow channels creating the desired fluid flow barrier. The formation volume occupied by the water or brine used to displace the emulsion fluid away from the well does not experience a loss in permeability due to resin deposition in flow channels. The shape and orientation of the barrier can be controlled by injection conditions depending on the problem to be cured. For example, in correcting a water coning problem, the specific gravity of the injected resin emulsion is adjusted to a value greater than the specific gravity of oil present in the adjacent formation. Preferably the specific gravity of the injected fluid is adjusted to a value which is from 5 to 20% greater than the specific gravity of oil in the adjacent oil formation by adding a water soluble non-ionic solid to the resin emulsion. Sugars are especially preferred for this purpose, and the especially preferred weighting material is sucrose. After the specific gravity adjusted resin emulsion composition is introduced through the wellbore and into the formation, the fluid migrates in a downward direction because of the influence of gravity, forming a disk or slightly conically shaped, pancake-like barrier. By adjusting the specific gravity, the barrier can be made to move downward to a point below the bottom perforation of the well before the reaction causing the formation of the impermeable barrier occurs.

In a different embodiment of this invention where it is desired to form a barrier at a point horizontally displaced from the perforations, the specific gravity of the resin emulsion is left unadjusted or adjusted to a value about equal to the specific gravity of the oil present in the formation.

DETAILED DESCRIPTION OF THE PREFERRED EMBODIMENTS THE PROCESS

This invention will be described with reference to particularly preferred embodiments which constitute the best mode known to the inventors at the time of this application. The type of formation in which the problem for which the present invention is intended as a cure are oil or petroleum containing formations and particularly those in which the mineral component comprises consolidated minerals such as limestone or dolomite. Such formations are permeable formations with at least a substantial portion of the formation pore spaces occupied by a fluid which is predominately liquid petroleum or oil. One embodiment of this process is applied to a petroleum formation which overlies a similarly permeable formation whose pore spaces are saturated with brine or water. There is no impermeable barrier between the oil saturated interval and the lower water saturated interval, and the oil-water interface which has stabilized over geologic periods of time is stable only because of the difference in specific gravity between the petroleum fluid occupying the pore spaces in the upper petroleum formation and the higher specific gravity water or brine occupying the pore spaces in the lower formation. The producing well is ordinarily drilled to to a point near the bottom of the oil saturated interval. The lower portion of the casing is closed off and perforations are established in the well casing in order to permit the flow of fluids from the oil-saturated formation into the interior of the well casing. The well is provided with tubing or other means to permit flow of petroleum to the surface of the earth as a result of natural pressure, or a pump may be necessary in order to transport the oil up the well. As oil is produced from the formation, a zone of reduced pressure is created around the perforations. This reduced pressure induces oil to flow into this zone horizontally from the more remote portions of oil saturated intervals, which is consistent with the intended oil production operation. Unfortunately, the same reduction in the pressure in the formation near the perforations causes water or brine to begin moving upward from the water saturated formation below the oil formation until the water reaches the lower perforations of the producing well. Continued pumping and production of fluids causes the oil-water interface to reach higher well perforations. In extreme cases of water coning, the fluid being recovered from the well approaches 100% water or brine and contains very little or no oil.

One simple solution to water coning is to cease pumping fluid from the well, thereby allowing the oil water interface to reform to the equilibrium state it originally occupied. Unfortunately, long periods of time are required for this condition to occur. Moreover, the passage of water through the cone area adjacent to perforations decreases the oil saturation in that portion of the formation, increasing the permeability in the portion of the formation within the cone which makes it possible for the cone to reform much more quickly after oil production operations are later resumed than was originally the case.

There are many processes described in the literature for producing fluid impermeable barriers in the formation for the purpose of reducing the flow of water into oil wells. Simply introducing a barrier-forming material into the formation through the perforations would effectively close off the well and prevent further production of any kind of fluids therefrom, which would of course be unsatisfactory as a means of inducing resumption of petroleum from the well.

We have discovered, and this constitutes our invention, that it is possible to form a properly located and shaped barrier below the bottom perforations of the producing well, which will restrain the upward movement of water or brine from the lower formation, while permitting the free flow of oil laterally into the perforations from the oil saturated interval.

Unlike the processes described in U.S. Pat. No. 4,475,593 and U.S. Pat. No. 4,462,449, no acid prewash is required and the resin emulsion treating fluid is not acidified to the extent of the fluids used in those references. If it is desired to form a barrier below the perforations to control water coning, the specific gravity of the resin emulsion must be adjusted to a value greater than the specific gravity of the oil or petroleum portion of the formation. The specific gravity adjustment is accomplished by adding to the resin emulsion treating fluid to be injected into the formation, a sufficient amount of non-ionic solid which is soluble in the fluids. Sugars are especially suitable for this purpose, and the especially preferred material is sucrose. Any non-ionic material soluble in the injected fluids can be used, but sugars in general and sucrose in particular are especially preferred because of their effectiveness, low cost and widespread availability. If the barrier is to be positioned on the same depth as the perforation, as in selective water exclusion or in correcting steam override problems, the resin emulsion specific gravity should be about equal to the specific gravity of the oil, which may not require the use of an additive.

It is believed that the Jamin Effect is at least partially responsible for the effectiveness of this process for reducing permeability of capillary flow channels in the formation. The resin precipitated from the emulsion as a result of interacting with the polyvalent metal ions is not a solid and so does not plug the channels as would a cement. The Jamin Effect explains the substantial increase in threshold pressure required to cause movement of a liquid in a capillary when a drop of an immiscible fluid is present in the liquid filled capillary. In order to move the drop of immiscible liquid in the capillary, it is necessary to distort the shape of the drop, which requires a change in surface area of the drop. The threshold pressure resulting from the presence of the drop of immiscible liquid (the resin in this application) in the capillary is a function of the interfacial tension of the resin. Thus it is possible to reduce the apparent permeability of a capillary flow channel to a very large degree by placing a small amount or coalesced drops of resin in the capillary. The barrier is formed as a result of the small drops of resin coalescing in many or all of the capillary flow paths of the formation, with all of the drops being arranged relative to one another to cause the barrier to be formed when it is desired, depending on the problem to be corrected by the barrier. The result is that the desired barrier can be formed using a very small amount of material.

The volume of treating fluid to be used can easily be calculated, knowing the dimension of the desired barrier and the formation porosity. Ordinarily the desired thickness of the barriers from 1 to 3 and preferably from 1.5 to 2.5 feet. Similarly, the volume of water or brine used to displace the treating fluid can be calculated knowing the pore volume of the formation between the well and the barrier where no plugging is desired.

THE RESIN EMULSION TREATING FLUID

The following describes the treating fluids utilized, which is essentially the same as described in U.S. Pat. No. 4,475,593 and U.S. Pat. No. 4,462,449 but it is repeated here for purpose of complete disclosure.

The resin emulsion comprises either an oil insoluble or an oil soluble hydrocarbon resin, emulsified with a surfactant in an aqueous media, which may in some embodiments also contain sufficient sucrose or other sugar to raise the fluid density to the desired value. The resin emulsion is one which demulsifies upon exposure to a sufficient concentration of polyvalent metal ions, especially ferric or ferrous ions. The resin precipitates from the emulsion and the barrier is formed whenever the concentration of ferric or ferrous ions in the resin emulsion fluid reaches the critical level.

The resins used herein are relatively high melting point hydrocarbons. In practice, resins are actually mixtures of hydrocarbon materials and consequently do not have a sharp melting point. Typically as temperature increases a resin goes from solid to tacky semisolid to liquid. Resins are often characterized by their softening point, which corresponds to the temperature midway through the semisolid stage. As will be appreciated by those skilled i the art, a resin selected for the methods of this invention should necessarily have a softening point near that of the formation temperature. It is preferred that the softening point of the resin used in the emulsion employed in our process be in the range from 5° to 10° F. above and below the formation temperature. If the softening point is too low, the viscosity of the resin in the precipitated drops will be too low to maintain a permanent, stable barrier at high temperatures. On the other hand if the resin selected has a softening point which is significantly higher than formation conditions, then demulsification of the resin results in granular particles which are too small and too hard to coalesce. Obviously a resin for use in connection with steam flooding operations should have a higher melting point than one used in curing water coning.

Resins are available in a large range of softening points. In addition, many materials not generally used as resins, such as asphaltenes or heavy residual oils for example, could serve as emulsified hydrocarbon component of the emulsion used in the process of this invention.

A resin emulsion is a resin which has been emulsified into an internal phase of resin particles on the order of micron size and an external water phase by use of a surfactant. On a commercial level only a few such resin emulsions are currently available. Most of these have relatively low softening points. As a result, Applicants have found it advantageous to custom formulize the resin emulsion, which will be described in more detail in the examples.

After the resin emulsion has been prepared, the pH is adjusted to the desired range which will be discussed below.

The resin emulsion utilized in the plugging experiments described below was prepared as follows. Picconol AA101, a 50% solid aqueous emulsion was obtained from Hercules, Inc., Wilmington, Del. Picconol AA101 is a proprietary product of Hercules, Inc. comprising neutral synthetic hydrocarbon resins derived from a variety of aliphatic or aromatic hydrocarbons, and terpene monomeric and other low molecular weight hydrocarbons. Also included in the resin emulsion is an anionic, acid stable surfactant which is about 6% of the resin by weight. The resin emulsion is further characterized in that it has a softening point of about 160° F. (71° C.), pH 4.5, 1 micron particle size, 0.98 specific gravity, surface tension of 29 dynes/cm, viscosity of 60 cps at 25° C., a viscosity of less than 1 centipoise at steam temperature, and intolerance to polyvalent metal ions such as iron, calcium and aluminum.

On request, Hercules, Inc. was able to supply Applicants with resin emulsion compositions similar to Picconol AA101 but with higher softening points. Both a 95° C. and 100° C. softening point resin emulsified identical to Picconol AA101 were provided.

Applicants have found that an inexpensive resin suitable for use in forming a barrier in the formation according to our invention may be produced by incorporating from 5 to 10 percent by volume of a viscous petroleum derivative such as vacuum resid obtained from refineries, in from 90 to 95 percent by volume water. From 5 to 6 percent by weight (of resin) of an effective emulsion stabilizing additive, e.g. a surfactant such as Emory Tryfac should be added to the emulsion.

TRIGGERING THE DEMULSIFICATION OF THE RESIN EMULSION

The key to using the resin emulsion described above to create our fluid impermeable barrier where it is determined that it is needed to be located in the formation depends on carefully adjusting the pH of the resin emulsion so polyvalent metal ions are removed from the formation mineral matrix at a controlled rate. Whereas an acid prewash was employed in U.S. Pat. Nos. 4,475,593 and 4,662,449 to remove all extractable polyvalent ions from unconsolidated sand grains in the particular formation involved, it is a feature of the present process that an acid prewash is not required and the fluid used has a somewhat higher treating fluid pH which slowly removes polyvalent metal ions from the formation mineral matrix. This does not appreciably reduce the amount of polyvalent ions in the zone adjacent to the formation where plugging is not desired but it does result in a build up of polyvalent metal ions in the treating fluid as the slug of treating fluid slowly passes through the formation. The polyvalent metal ions are distributed throughout the mineral matrix in a sandstone or dolomite formation rather than being located on the surface of the sand grains as is the case in many heavy oil reservoirs where the mineral part of the formation comprises unconsolidated sand grains. If one attempted to remove all extractable polyvalent ions in a sandstone or dolomite formation, very large volumes of acid and long period of wash treating time would be required.

We have discovered that the critical parameter is the rate of extraction of the extractable ions rather than the total available quantity. The rate of extraction of polyvalent metal ions passing through a permeably foundation is fluid pH dependent. Further, we know that there is a maximum metal ion content (whether at a single metal or some specified combination of metals) which a resin emulsion of given concentration will tolerate without demulsification. By proper selection of treating fluid pH, it is possible to adjust the rate of absorption of polyvalent metal ions to a desired level such that precipitation of resin occurs at the desired location in any particular formation. Thus, it can be appreciated that the pH of the resin emulsion varies with different mineral or rock types and is critical in our process.

If the resin emulsion can be placed where desired before demulsification occurs, the desired objective will have been achieved. There will be a no-plug region of chosen size with a barrier to flow just beyond that zone. The latter will occur if, after placement, the fluid injection rate into the well is reduced to a very low value for a period long enough for demulsification reaction to be essentially completed.

It was originally believed that the well could be shut in for the duration of the cure phase; however, it was found that it is essential that the injected resin-containing fluid be kept in motion while the barrier is being formed. The rate of movement should be very low but always positive during the soak period. This can be accomplished by injecting displacing fluid such as brine at a very low rate, e.g. 1 to 100 and preferably 1 to 50 gallons per hour, continuously over the soak period.

By adjusting the pH of the resin emulsion to a value in the range of 2 to 6 and preferably 3 to 5, polyvalent metal ions capable of causing precipitation of resin from the resin emulsion will slowly be removed from the formation mineral matrix as the pH adjusted resin emulsion passes through the formation. It is preferred that the exact pH for each formation be determined experimentally. A resin emulsion whose pH is within the above limits will pass a significant distance through the formation before the polyvalent metal ion concentration in the slug of resin emulsion increase to the critical concentration which causes precipitation of resin droplets from the emulsion. The location of the plugged zone can be controlled more precisely by determining experimentally the time required for the polyvalent metal ion concentration to reach the desired level at various pH levels of treating fluid, using actual formation samples. Alternatively, the pH at which the resin precipitates from the treating fluids in the desired time when contacting actual formation samples can be determined. The time required is known from the injectivity of the well and the volume of both the treated fluid and displacing fluid required to be injected to form the desired barrier.

Since the concentration of polyvalent ions increases slowly as the fluid passes through the formation, the precipitation of resin does not occur immediately after the first portion of the fluid enters the formation; rather, it will occur only after the emulsion has passed through sufficient volume of formation, and has been in contact with the formation for a sufficient period of time, to permit the concentration of polyvalent metal ions removed from the formation mineral matrix to build in the treating fluid until it has reached a critical level at which destabilization of the emulsion causing precipitation of emulsion in the formation flow channels occurs. The coalesced resin droplets effectively plug the pore spaces of the water rich formation or played out zones thereby creating a barrier to subsequent fluid flow. In water coning applications, the barrier is established over a relatively large distance, somewhat flat and extending outward from the wellbore due to the combined effects of injection pressure and fluid density.

Further it should be apparent that if the resin emulsion, which comprise an oil soluble resin, contacts an oil rich region, no permanent plugging occurs even if extractable metal ions are present. In situations where the resin emulsion comprises an oil insoluble resin, the relative oil, water solubilities of resin will cause the resin to preferentially coalesce in the water rich strata as opposed to the oil rich strata.

To further illustrate the invention and demonstrate the results obtained, several laboratory experiments have been performed by the Applicants. The examples which follow, should not be considered as limiting the invention but rather only as exemplary of the various embodiments based on those laboratory results.

Experimental

EXAMPLE 1

Bench scale extractions were conducted on fresh Berea material. In the initial runs, 25 g Berea plugs were soaked for one week in 100 ml samples of solutions varying in pH from 7-10. The pH was adjusted using sodium hydroxide. The ICAP analyses are listed in Table 1.

TABLE 1

| | Berea Plug Soaks mg/l | | | |
|---|---|---|---|---|
| | pH 7 | pH 8 | pH 9 | pH 10 |
| Al | — | — | 0.2 | 0.1 |
| Ca | 2.01 | 4.4 | 1.9 | 1.7 |
| Fe | — | — | — | — |
| Mg | 1.5 | 2.6 | 2.2 | 1.6 |

The second type of bench scale extractions consisted of repeating the preceding experiments using 24.4 g of crushed Berea. Results of ICAP analyses are listed in Table 2.

TABLE 2

| | Crushed Berea Cores mg/l | | | |
|---|---|---|---|---|
| | pH 7 | pH 8 | pH 9 | pH 10 |
| Al | — | 2.3 | 3.7 | 4.4 |
| Ca | 13.6 | 6.9 | 6.3 | 2.3 |
| Fe | .022 | 0.615 | 0.818 | 1.067 |
| Mg | 4.4 | 2.4 | 1.6 | 2.66 |

Core runs were then conducted to see if a Picconol AA-101 solution would plug a Berea core if allowed to stand for an extended period of time. A three inch Berea core was cast in epoxy and fitted with valves. The core was evaluated, charged, and the permeability was determined to be 209 md with a 39.8 ml pore volume. A pore volume of 5% Picconol AA-101 solution, pH 7, was injected into the core and allowed to set for one week. The permeability of the core was then checked and the core was found to be plugged to 100 psi.

A second core run was then conducted to test the ability to place the plug were desired. Two three-inch Berea cores were cast in epoxy, fitted, evacuated, and charged. Their respective permeabilities and pore volumes were found to be 200 md, 42 ml, and 206 md, 42.5 ml. The cores were then connected and a single core pore volume of 5% Picconol AA101, pH 7, solution was injected at a rate of 4 ft/day. A slug of water was then injected at the same rate. The amount of water injected was slightly above that of a single core pore volume. After nine days, the cores were disconnected and the permeability of each core was tested. The permeability of the first core was found to be 203 md and the second core was found to be plugged at 60 psi of pressure.

A third core flood run was performed as follows. A 6 inch berea core was casted in epoxy and fitted with valves. Various aqueous buffered solutions were injected into the berea core and allowed to stand for one week to determine the extent of extraction of metal ions affected at a given pH. It was found that for this particular core a pH of 4 was adequate for extracting the 100 ppm $Ca^{2+}$ necessary to deemulsify a 5% Picconol AA-101 solution. The core was charged with deionized water, heated to 200° F., and a 5% Picconol AA-101 pH 4 buffered solution was then injected. After a pore volume of the resin emulsion was injected the flow rate was adjusted to a trickle and allowed to run for one week. After a week a plug, at 60 psi, was formed. The core was backflowed with the plug breaking at 18 psi.

PILOT FIELD EXAMPLE

For the purpose of further illustrating the best mode of applying their invention, Applicants hereby supply the following pilot field example. A producing well is drilled into a subterranean petroleum-containing dolomite formation which is 60 feet thick and which overlies a high permeability formation saturated with a 10% oil field brine. The permeability of the oil formation is 250 milidarcies and the porosity is 30%. The producing well is drilled to a level just above the bottom of the oil saturated formation and a plug set at the bottom of the well casing. Perforations are formed over about the middle half of the oil producing interval. A producing tubing and a downhole pump are installed in the well and production is begun from the well. Although the well is initially a good producer, after about six months, the water oil ratio of the fluid being produced begins rising and after approximately one year of operation, the water content of the produced fluid is approaching 100% and the amount of oil being recovered from the well is so low that continued operation of the well is unjustified. It is determined that well is experiencing bottom water coning, and it is estimated that the cone has risen approximately 30 feet from the bottom of the original oil water interface and that the radius of the cone is approximately 75 feet. It was decided to treat the well in hopes of forming a barrier below the lower perforations of the producing well extending radially outward and ideally oriented downward in order to deter flow of water from the underlying aquifer into the perforations of the well when production of fluids from the well resumes. It is hoped to form a barrier approximately 5 feet thick and extending radially outward a total of 60 feet. This would require the placement of a barrier having a gross volume of $$11 (75)^2 (5) = 88,312 \text{ cu. ft.}$$

Since the porosity of the formation is known to be 30%, then the volume of treating fluid necessary to form this barrier in the desired location would be 0.3×88,312 or 26,493 cu.ft. This requires 198,200 gallons of resin emulsion treating fluid.

In order to ensure that the resin is displaced from the cone shaped zone immediately adjacent to the perforations, where it is desired that the barrier not be formed, a quantity of brine or water should be injected to occupy the approximate volume of the cone previously formed by the water coning phenomena. For this purpose, a 5% brine solution was injected into the perforations at a rate of 5,000 gallons per hour for 24-hour period. The volume necessary to fill the cone shaped zone is $\frac{1}{3}11(R)^2(H)(\text{Porosity})$ or $\frac{1}{3}(3.14)(75)^2(60)(0.30) = 105,974$ cu. ft.

which is equivalent to 793,790 gallons of brine.

The following briefly outlines the methods for formulating the fluids and the sequence of injecting the fluids in order to form the barrier according to the process of our invention. Tests using core samples from the formation indicate that the rate of absorption of polyvalent metal ions by the treating fluid from the formation mineral matrix which causes precipitation of resin from the emulsion was within the desired range when the fluid pH is 5.5. The desired time for reaching the critical concentration is known from the volumes of treating fluid to be injected and the injectivity of the formation. In this example, the injectivity of the resin emulsion into the formation is 5,000 gallons per hour. It is desired to inject the 26,493 gallons of treating fluid and 792,790 gallons of displacing fluid before precipitation of resin begins. The injection time will be 12 days and as a safety factor, 6 days of soak are provided for. The pH of the fluid is chosen on the basis of ferric and ferrous ion concentration reaching the critical level of 100 parts per million after 12 days. Laboratory tests using various pH samples of treating fluid indicated that this level of ion concentration would be achieved in 12 days using pH of 5.5.

A suitable acidified resin emulsion composition is formulated for the purpose of forming the impermeable barrier. The resin chosen for this application is Picconol AA101 diluted to a 5% solid emulsion using water. The pH is adjusted to 5.5. To 198,200 gallons of this fluid was added sufficient sucrose to increase the specific gravity of the resin emulsion to a value of about 0.95, which is necessary to ensure that the resin fluid moves slowly downward in the oil formation after its injection thereunto as a result of its density being greater than the density of the oil. The quantity of resin emulsion with density adjusted to 0.95 and pH adjusted to 5.5 is injected into the formation at a rate of about 121,121 gallons per day. After the resin emulsion and displacing fluid is injected, brine is injected at a rate of 10 gallons per hour for the duration of the dynamic soak period, to ensure that the slow resin movement is maintained. The injection rate should be controlled carefully in order to ensure that the exposure time of the fluid to the formation is about 12 days, since this is the minimum time required for this fluid to absorb sufficient polyvalent metal ion from the formation to cause destabilization of the emulsion. The downward movement of the weighted fluid is not overshadowed by the dynamic effect of rapid injection of the fluid into the formation adjacent to the producing well.

The slow fluid movement soak period sufficient to ensure that the resin formulation has completely reacted and hardened, which requires at least 6 days. The well is thereafter put back on pump, and production of oil with relatively little water is obtained, indicating the water cone problem has been alleviate by the above described treatment.

Although our invention has been described in terms of numerous embodiments which Applicants believe to represent the preferred embodiments and to include the best modes of applying the process of this invention known at the time of making this application, it is recognized to persons skilled in the art that various modification may be made to the composition and procedures followed as described in the specification without departing from the true spirit and scope of the invention which are defined in the claims appended immediately hereinafter below.

What is claimed is:

1. A method of treating an oil well completed in an oil containing consolidated formation, said well having communication means with at least a portion of the oil formation, to form a fluid impermeable barrier in the formation displaced from the oil well which comprises the steps of:
    (a) forming an aqueous resin emulsion treating fluid comprising a dispersed hydrocarbon, water and surfactant, which emulsion is susceptible to demulsification on contact with a sufficient concentration of polyvalent metal ions, said treating fluid pH being in the range of from 2 to 6;
    (b) introducing said resin emulsion treating fluid through the well into the formation at a predetermined injection rate, whereupon the resin emulsion begins extracting polyvalent metal ions from said formation;
    (c) thereafter injecting an aqueous displacement fluid into the formation to displace the treating fluid to the location in the formation where it is desired to form the barrier;
    (d) controlling the rate of injecting the treating fluid and displacing fluid as a function of the rate which polyvalent metal ions are removed from the formation so the level of polyvalent metal ions in the treating fluid reaches the critical concentration for precipitating hydrocarbon from the treating fluid after the treating fluid has been displaced away from the wellbore to the desire location;
    (e) reducing the injection rate of the aqueous displacement fluid into the well to a predetermined value for a period of time sufficient to permit the hydrocarbon to precipitate from the treating fluid, forming the fluid impermeable barrier.

2. A method as recited in claim 1 wherein the aqueous displacing fluid is brine containing from 3,000 to 6,000 parts per million total dissolved solids.

3. A method as recited in claim 1 wherein the hydrocarbon is an oil soluble resin.

4. A method as recited in claim 1 wherein the hydrocarbon is an oil insoluble resin.

5. A method as recited in claim 1 wherein the emulsion comprises from about $\frac{1}{8}$% to about 5% solids and anionic surfactant.

6. A method as recited in claim 1 wherein the oil formation overlies a permeable water formation and the barrier is located below the communication means of the well to prevent bottom water coning comprising adding sufficient nonionic water soluble organic solids to the treating fluid to raise the density of the treating fluid to a value greater than the formation petroleum so the treating fluid moves downward in the oil formation after it is injected into the formation.

7. A method as recited in claim 6 wherein the fluid added to the treating fluid to increase its density is a sugar.

8. A method as recited in claim 7 wherein the sugar is sucrose.

9. A method as recited in claim 7 wherein the density of the treating fluid is from 1.01 to 1.30 times than the density of the oil in the oil formation.

10. A method as recited in claim 1 comprising the additional step of determining the pH of the treating fluid by exposing samples of formation material to samples of aqueous fluid having different pH values and identifying the pH at which at least 100 parts per million ferric and ferrous ions will be removed from formation material after exposure for a period of time from 6 to 12 days wherein the weight ratio of test solution to formation material is 4:1.

11. A method as recited in claim 1 comprising the additional step of determining the pH of the treating fluid by exposing samples of formation material to samples of treating fluid having different pH values in the range of 2 to 6 for a period of from 6 to 12 days and identifying the pH at which the hydrocarbon will precipitate from the treating fluid after at least 6 days.

12. A method as recited in claim 1 wherein the fluid injection rate of step (e) is from 1 to 100 gallons per hour.

* * * * *